(12) United States Patent
Guichard et al.

(10) Patent No.: US 7,969,983 B2
(45) Date of Patent: Jun. 28, 2011

(54) NETWORK SCALING WITH SUMMARIZED INTERNET PROTOCOL LABEL SWITCHED PATHS

(75) Inventors: James Neil Guichard, New Boston, NH (US); George L. Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 12/142,245

(22) Filed: Jun. 19, 2008

(65) Prior Publication Data

US 2009/0003350 A1  Jan. 1, 2009

Related U.S. Application Data

(60) Provisional application No. 60/947,318, filed on Jun. 29, 2007.

(51) Int. Cl.
*H04L 12/28* (2006.01)

(52) U.S. Cl. .................................................. 370/392
(58) Field of Classification Search .................. None
See application file for complete search history.

(56) References Cited

U.S. PATENT DOCUMENTS

| | | | |
|---|---|---|---|
| 6,603,756 B1 * | 8/2003 | Tappan | 370/351 |
| 2005/0125490 A1 * | 6/2005 | Ramia | 709/202 |
| 2006/0262735 A1 * | 11/2006 | Guichard et al. | 370/254 |

* cited by examiner

*Primary Examiner* — Chirag G Shah
*Assistant Examiner* — Yong Zhou
(74) *Attorney, Agent, or Firm* — Schwegman, Lundberg & Woessner, P.A.

(57) ABSTRACT

In one example embodiment, a system and method are shown that includes receiving information defining a route to a network device. Further, a routing summary summarizing the route to the network device is generated. Additionally, an aggregate label is selected that corresponds to a defined class and to the routing summary. Moreover, the aggregate label and the defined class are advertised into a domain.

12 Claims, 13 Drawing Sheets

NETWORK SCALING WITH SUMMARIZED INTERNET PROTOCOL LABEL SWITCHED PATHS

CROSS REFERENCE TO RELATED APPLICATIONS

This is a non-provisional patent application claiming priority under 35 USC §119(e) to U.S. Provisional Patent Application No. 60/947,318 filed on Jun. 29, 2007 entitled "METHOD AND APPARATUS TO SCALE IP LABEL SWITCHED PATHS," which is incorporated by reference in its entirety.

FIELD

The present disclosure relates generally to scaling label switched path networks.

BACKGROUND

Example Border Gateway Protocol (BGP)/Multiprotocol Label Switching (MPLS) Internet Protocol (IP) in Virtual Private Networks (VPNs) require that the /32 host address of the edge device be available end-to-end. End-to-end may include from ingress to egress edge device, so that Label Distribution Protocol (LDP) can setup edge to edge Label Switched Paths (LSPs). As a result, service providers carry the /32 host address of each edge device within their Interior Gateway Protocol (IGP).

BRIEF DESCRIPTION OF DRAWINGS

Example embodiments are illustrated by way of example and not limitation in the figures of the accompanying drawings, in which like references indicate similar elements and in which.

DETAILED DESCRIPTION

Overview

In one example embodiment, a system and method are shown that includes receiving information defining a route to a network device. Further, a routing summary summarizing the route to the network device is generated. Additionally, an aggregate label is selected that corresponds to a defined class and to the routing summary. Moreover, the aggregate label and the defined class are advertised into a domain.

In one example embodiment, a system and method are shown that include receiving a packet to be routed to a destination address. Further, a packet is processed that identifies an aggregate label covering the destination address. Moreover, a de-aggregate label is generated based upon the destination address. Additionally, the aggregate label and the de-aggregate label is transmitted as part of a label stack.

In the following description, for purposes of explanation, numerous specific details are set forth in order to provide a thorough understanding of an embodiment of the present invention. It may be evident, however, to one skilled in the art that the present invention may be practiced without these specific details.

Figure 1:
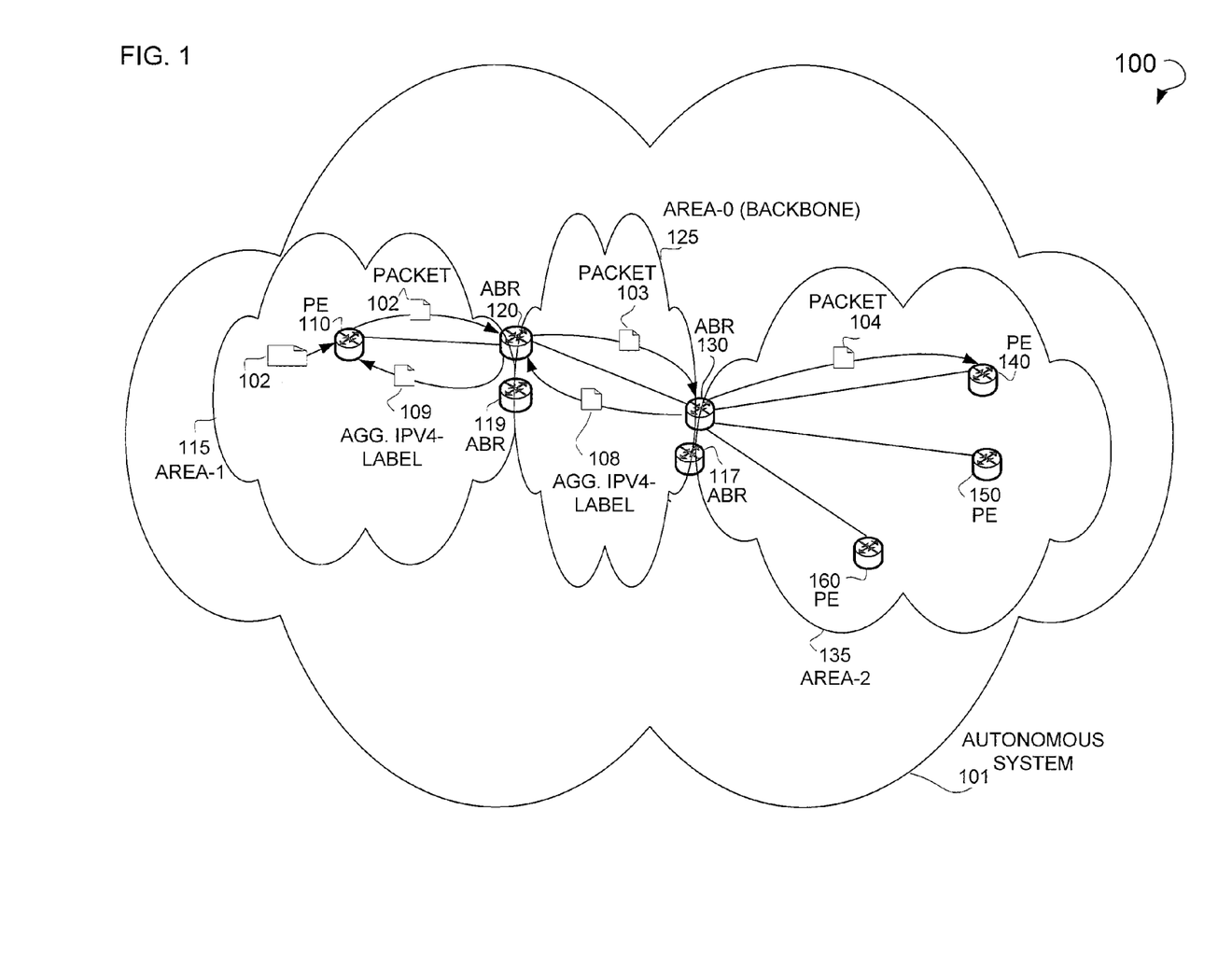
FIG. 1 is a diagram of a system, according to an example embodiment, illustrating the swapping of Aggregate Internet Protocol Version 4 (IPv4) labels (Agg. IPv4-Labels) within an Open Shortest Path First (OSPF) based network.

FIG. 1 is a diagram of an example system 100 illustrating the swapping of Agg.-IPv4 Labels within an OSPF based network. The Agg. Label and De-Agg. Label may be used in conjunction with the Internet Protocol Version 6 (IPv6) such that a new Aggregate IPv6-Label for a summarized route in a network is introduced into LDP, as well as, an algorithmically derived De-Agg. Label per route covered by the routing summary. An Agg. Label may be a numeric value representing a member of a defined class. A De-Agg. Label may be an algorithmically generated numeric value. For the purposes of illustration only, a new Aggregate IPv4-Label is referenced and shown herein. Additionally, the De-Agg. Label and De-Agg. Label may be used in conjunction with MPLS and one or more defined classes within MPLS. A defined class is a class that describes a set of packets with similar and/or identical characteristics which may be forwarded the same way. An example of a defined class includes a FEC. Swapping may include taking at least one label and replacing the label with another label. Shown is an Autonomous System 101 including a number of areas, including an Area-1 115, an Area-0 125, and an Area-2 135. Included within the Area-1 115 is packet 102 provided to a Provider Edge (PE) 110. This PE 110 may route the packet 102 across the one or more areas (e.g., Area-1 115, Area-0 125, and Area-2 135) to be received by a PE 140 that resides within the Area-2 135.

Operatively connected to the PE 110 is an Area Border Router (ABR) 120 that sits on the border between the Area-1 115 and the Area-0 125. Moreover, an ABR 119 also sits on the border between the Area-1 115 and Area-0 125. The PE 110 receives an Agg. IPv4-Label 109 from the ABR 120. This Agg. IPv4-Label 109 is applied to a label stack (e.g., an MPLS label stack) along with an algorithmically generated De-Agg. Label that is then associated with the packet 102. Further, this Agg. IPv4-Label 109 may allow the PE 110 to transmit the packet 102 across the Area-1 115 to be received by the ABR 120. This Agg.-IPv4 Label 109 and De-Agg. Label represent a next hop label for the PE 110.

The ABR 120 may utilize an Agg.-IPv4 Label 108 that is received from ABR 130. This Agg.-IPv4 Label 108 may be swapped with the Agg.-IPv4 Label 109 to create packet 103 that includes the Agg.-IPv4 Label 108. The ABR 130 may sit on the border between the Area-0 125 and the Area-2 135. Also sitting on this border is an ABR 117. This ABR 130 may pop the label stack associated with the packet 103 to create a packet 104. The De-Agg. Label is swapped with another label using a context-specific Incoming Label Map (ILM). This packet 104 is transmitted by the ABR 130 to the previously referenced PE 140. This PE 140, along with a PE 150 and PE 160, may reside within the Area-2 135.

Figure 2:
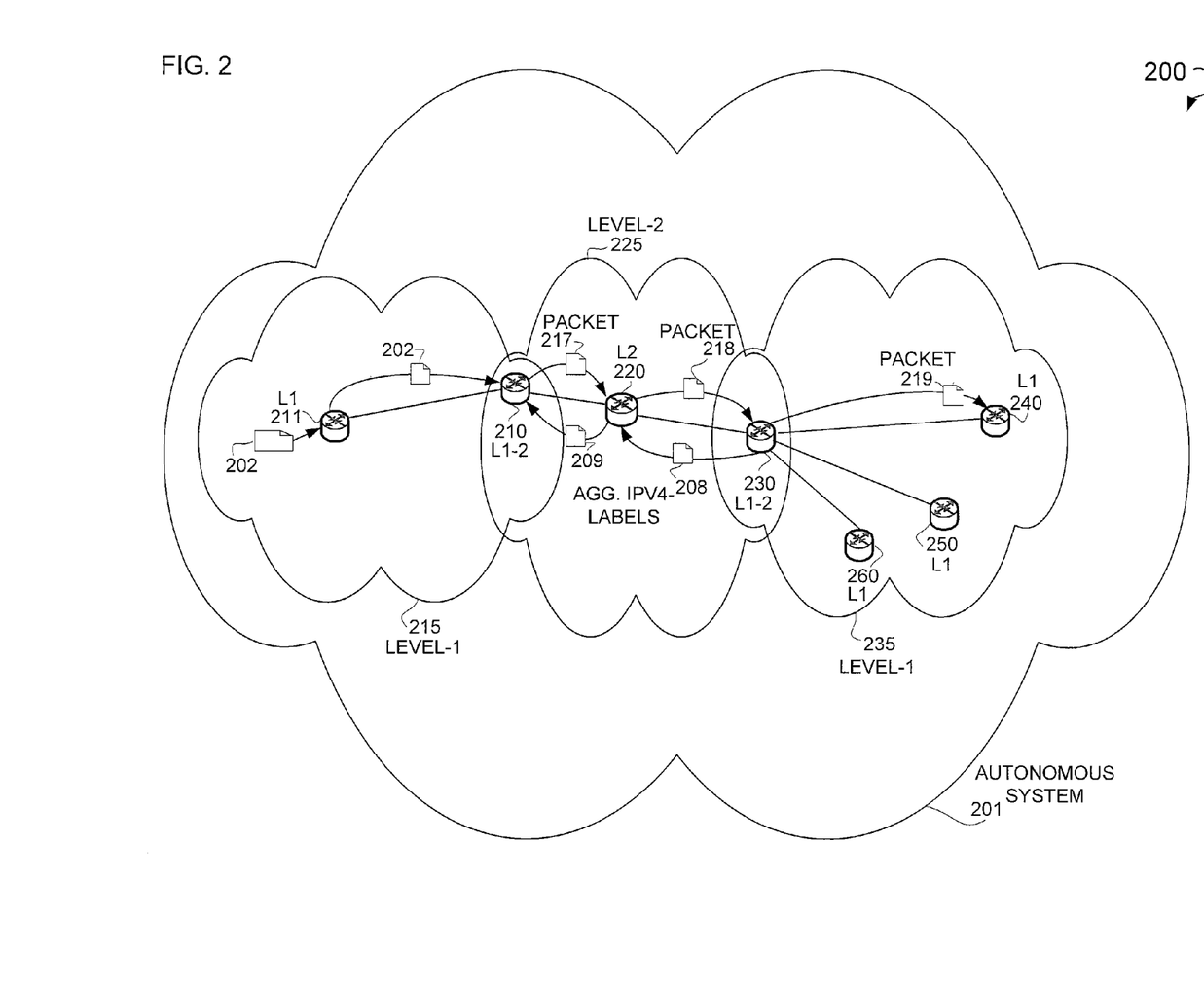
FIG. 2 is a diagram of a system, according to an example embodiment, illustrating the use of Agg.-IPv4 Label Swapping within an Intermediate System to Intermediate System (IS-IS) based network.

FIG. 2 is a diagram of an example system 200, illustrating the use of Agg.-IPv4 Label swapping within an IS-IS based network. Shown is an Autonomous System 201 with a number of levels. For example, a Level-1 215 is shown, a Level-2 225 is shown and a Level-1 235 is shown.

Residing in Level-1 215 is an L1 Router 211. This L1 Router 211 may receive packet 202. This packet 202 is transmitted to a L1-2 Router 210 that may also reside within the Level-1 215. Using an Agg.-IPv4 Label 209 along with an algorithmically generated DE-Agg. Label received from a L2 Router 220 residing within Level-2 225, the L1-2 Router 210 may encapsulate or label swap the labels associated with the packet 202 to create a packet 217.

This packet 217 is transmitted by the L1-2 Router 210 to be received by an L2 Router 220 that resides within Level-2 225. This L2 Router 220 may swap the Agg.-IPv4 Label 209 with the Agg.-IPv4 Label 208. Once this label swapping occurs, the L2 Router 220 may transmit packet 218 that has the Agg.-IPv4 Label 208 associated with the packet 218. This L1-2 Router 230 may receive the packet 218, and pop the Agg.-IPv4 Label 208 associated with the packet 218 and swapping the De-Agg. Label to create a packet 219. Packet 219 is transmitted by the L1-2 Router 230 to be received by an L1 Router 240. L1-2 Router 230 and L1 Router 240 may reside as a part of Level-1 235. Also residing within Level-1 235 is an L1 Router 260, and an L1 Router 250.

Figure 3:
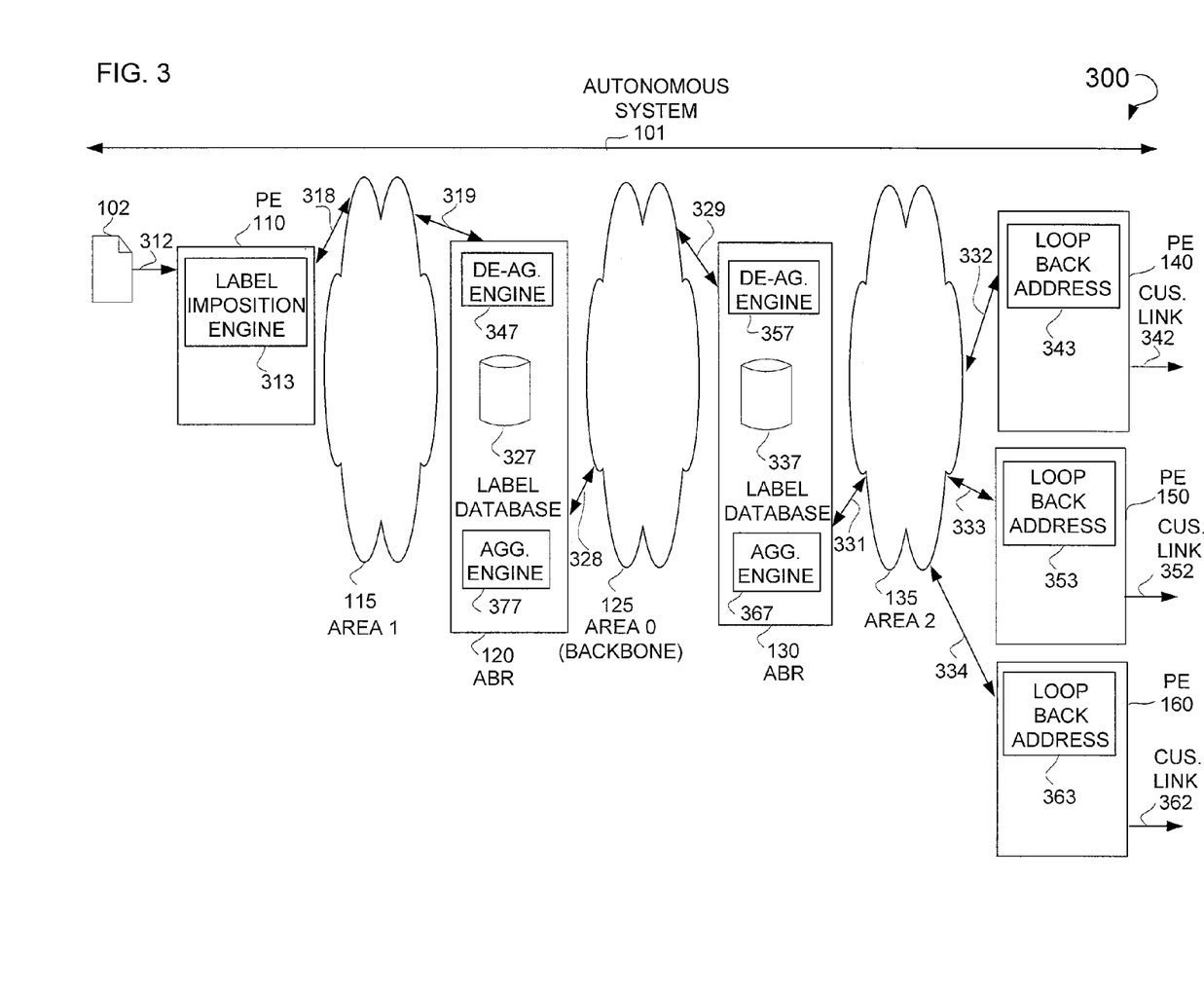
FIG. 3 is a diagram of a network, according to an example embodiment, utilizing Agg. IPv4-Labels and de-aggregation labels (De-Agg. Labels) within an OSPF based network.

FIG. 3 is a diagram of a network 300, in accordance with an example embodiment, utilizing Agg. IPv4-Labels and De-Agg. Labels within the context of OSPF. As shown above, IS-IS could be used in lieu of OSPF. This diagram of network 300 may show various modules residing as part of the various devices that reside within this network 300. These modules may be implemented in hardware, firmware, or software. This network 300 includes the PE 110, an ABR 120, an ABR 130 and one or more PEs 140, 150, and 160. PE 110 includes an input 312 operable to receive packet 102.

PE 110 may reside as part of Area-1 115 through interconnect 318. An interconnect may be a logical or physical connection. ABR 120 may serve Area-1 115 through interconnect 319, and is further coupled to the Area-0 125 (e.g., a Backbone Area) through interconnect 328. Area-0 125 is connected to the ABR 130 through interconnect 329. ABR 130 is coupled to Area 2 135 through interconnect 331.

In some example embodiments, Area-2 135 may include one or more PEs 140, 150, and 160. In various example embodiments, Area-2 135 is coupled to PE 140 through interconnect 332. Additionally, Area-2 135 is coupled to PE 150 through interconnect 333. Moreover, Area-2 135 is coupled to PE 160 through interconnect 334.

In some example embodiments, each PE 140, 150 or 160 has an associated loopback address indicated by 343, 353, and 363, respectively. Moreover, one or more customer links 342, 352, and 362 are shown, wherein these customer links are logical or physical links to, for example, a VPN or other suitable network service via MPLS.

In some example embodiments, a number of modules may be associated with various ABRs and PEs. Included in the PE 110 is a Label Imposition Engine 313 that may algorithmically calculate a De-Agg. Label. Further, ABR 120 includes a De-Agg. engine 347, Label database 327, and Agg. engine 377. Included in the ABR 130 is a De-Agg. engine 357, Label database 337, and Agg. engine 367.

In various example embodiments, through the operation of one or more of PEs 140, 150, and 160, the loop back addresses 343, 353, and 363 are advertised into Area-2 135, which includes ABR 130. ABR 130 may build a context-specific ILM to associate a label with each of the addresses 343, 353, and 363. The ABR may advertise a summary address and associated Agg.-IPv4 label into the Area 0 125, and eventually this advertisement reaches PE 110 by way of ABR 120. When packet 102 is received at PE 110 that is to be routed via one of PEs identified by the addresses 343, 353 or 363, PE 110 uses the Label Imposition Engine 313 to algorithmically derive a De-Agg. Label based on the next-hop address provided (e.g., the BGP next-hop address for ABR 120). PE 110 may push the De-Agg. Label onto the label stack (e.g., label for VPN route). An Agg. IPv4-Label may then be pushed onto the De-Agg. Label.

In some example embodiments, the received packet 102 is then forwarded to ABR 120 through Area-1 115, wherein the Agg.-IPv4 Label is swapped with a second Agg.-IPv4 Label received from an upstream Label-Switching Router (LSR). This second Agg.-IPv4 Label covers the same summary address along the route to ABR 130, as the first Agg.-IPv4 Label. In some example embodiments, ABR 130 uses the Agg.-IPv4 Label and the De-Agg. Label to determine the label associated with the /32 bit PE address needed to forward the packet through Area-2 135 to the proper PE 140, 150, or 160. In various example embodiments, this process also allows the packet to be routed through network 300 from any of PEs 140, 150, 160 to PE 110.

Figure 4:
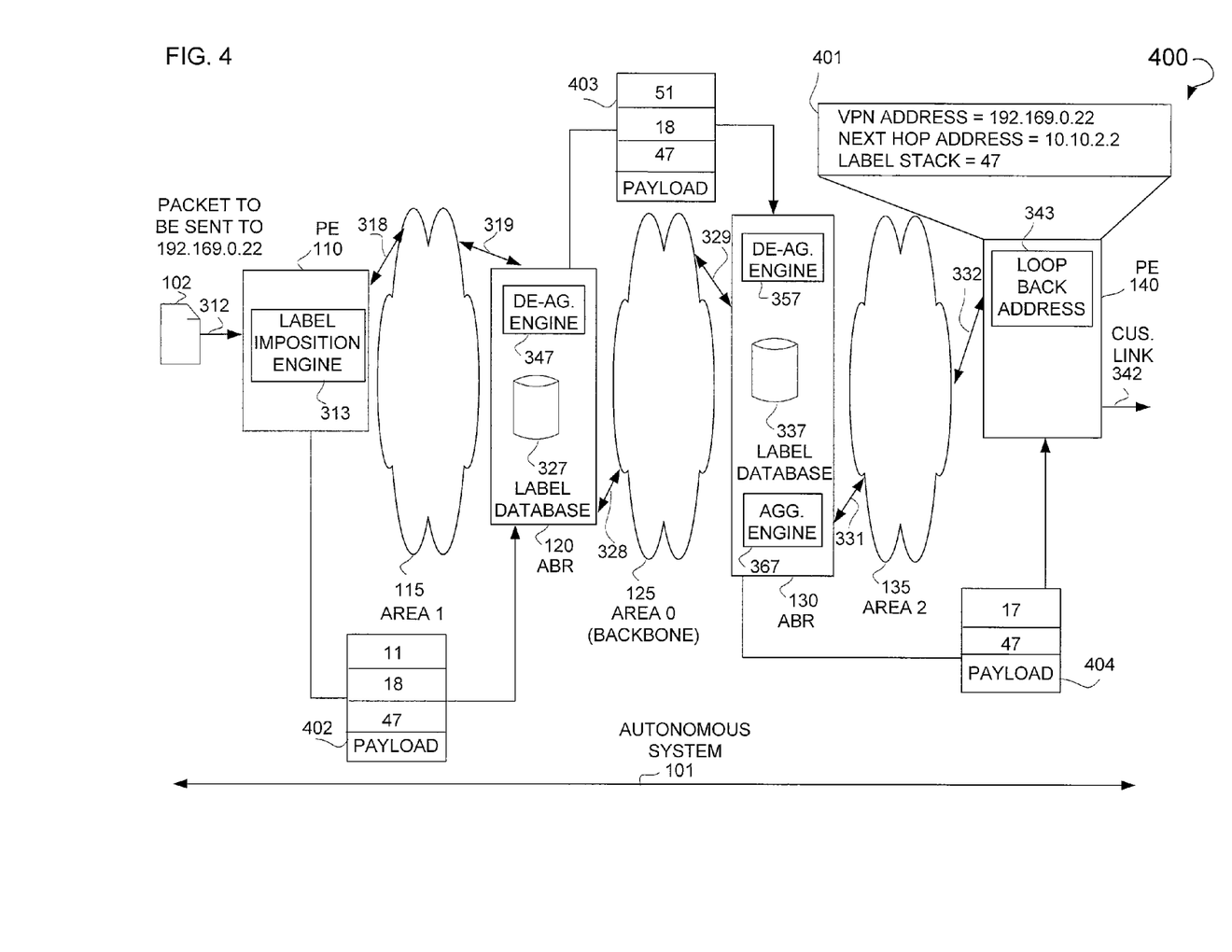
FIG. 4 shows a network, according to an example embodiment, illustrating the use of label swapping.

FIG. 4 shows a network 400 illustrating the use of label swapping. Shown is network information 401 associated with the PE 140 that includes a VPN address of 192.169.0.22/32, a BGP next-hop address of 10.10.2.2, and a label stack value of "47." In one example context, 10.10.2.2 acts as a BGP next-hop address, while in another context, 10.10.2.2 acts as a loopback address. In some example embodiments, when packet 102 is received, PE 110 may determine that the packet 102 is to be routed to VPN address 192.169.0.22 via the BGP next-hop address 10.10.2.2 belonging to PE 140. PE 110 may push label "47" onto the label stack 402 for the packet 102. PE 110 may then select an Agg.-IPv4 Label "11" for 10.10.2.2 corresponding to the FEC that best matches the BGP next-hop address 10.10.2.2 of the VPN route 192.169.0.22. The PE 110 may algorithmically derive a De-Agg. Label "18," which is pushed onto label stack 402. The PE 110 may then push this Agg.-IPv4 Label "11" onto the label stack 402 such the label stack 402 has the order {11, 18, 47}.

At ABR 120, a label swap occurs such that Agg.-IPv4 Label "11" is swapped with Agg.-IPv4 Label "51" and packet is forwarded towards ABR 130. The swapped value "51" represents an illustration of the Agg.-IPv4 Label received from ABR 130.

At ABR 130, the label stack 403 is popped to remove the value of "51," which indicates the context-specific ILM to lookup the next label in the label stack 403. Next, the De-Agg. Label having a value of "18" is referenced in the context-specific ILM and the label value "17" that represents the originating router of the VPN route (e.g. PE 140) is referenced. A new label stack 404 is generated including the values "17" and "47." The packet 104 is then forwarded towards PE 140.

Figure 5:
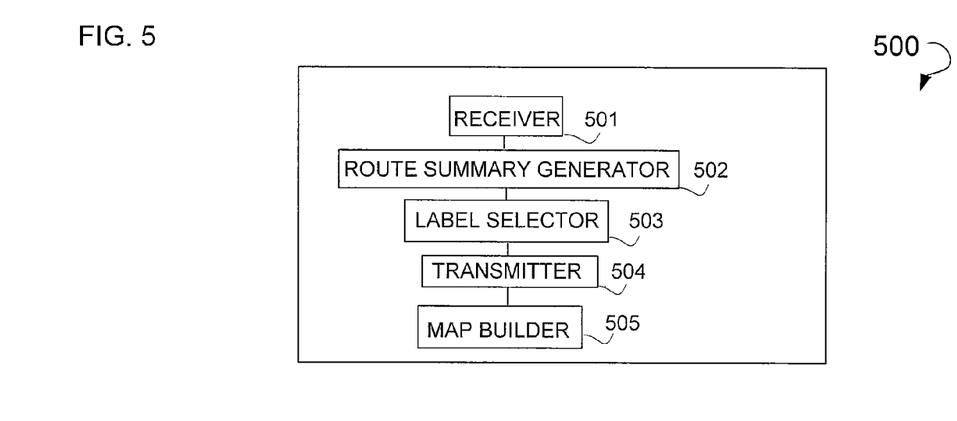
FIG. 5 is a block diagram of a computer system, according to an example embodiment, used to select and advertise an aggregate label and Forwarding Equivalence Class (FEC).

FIG. 5 is a block diagram of an example computer system 500 used to select and to advertise an aggregate label (e.g., the Agg.-IPv4 Label) and FEC. The blocks illustrated herein may be implemented in hardware, firmware, or software. These blocks 501 through 504 may be implemented by the ABR 130 or some other suitable computer system. A receiver 501, a route summary generator 502, a label selector 503, and a transmitter 504, and map builder 505 are shown. Further, these blocks are communicatively coupled via a logical or physical connection. A network device may be a switch, router, bridge, or other suitable device. Communicatively coupled to this receiver 501 is a route summary generator 502 to generate a routing summary summarizing the route. A routing summary may be a series of number values represented using Classless Inter-Domain Routing (CIDR) notation. Semantics may include an application of mathematical logic reflecting the meaning of a program or function. Illustrated is a computer system 500 including a receiver 501 to receive information that defines a route to a network device. Communicatively coupled to the receiver 501 is a route summary generator 502 that generates a routing summary that summarizes the route to another network device. A label selector 503 is shown that selects an aggregate label that corresponds to a defined class and to the routing summary. This label selector 503 is communicatively coupled to the summary generator 502 and to a transmitter 504 that advertises the aggregate label and the defined class into a domain. A domain may be an autonomous system, an area in OSPF, a level in IS-IS, or a network and related topology. In some example embodiments, the defined class has semantics that include an algorithm for generating a De-Agg. Label for a destination address covered by the routing summary. Further, the algorithm includes the destination address and a length of the routing summary. Communicatively coupled to the transmitter 504 is a map builder 505 to build a context specific ILM that includes a mapping for a De-Agg. Label, wherein the ILM is referenced by the aggregate label. In some example embodiments, the mapping for the De-Agg. Label maps to a label for the route. The aggregate label for map to be received via a protocol including at least one of LDP or BGP.

Figure 6:
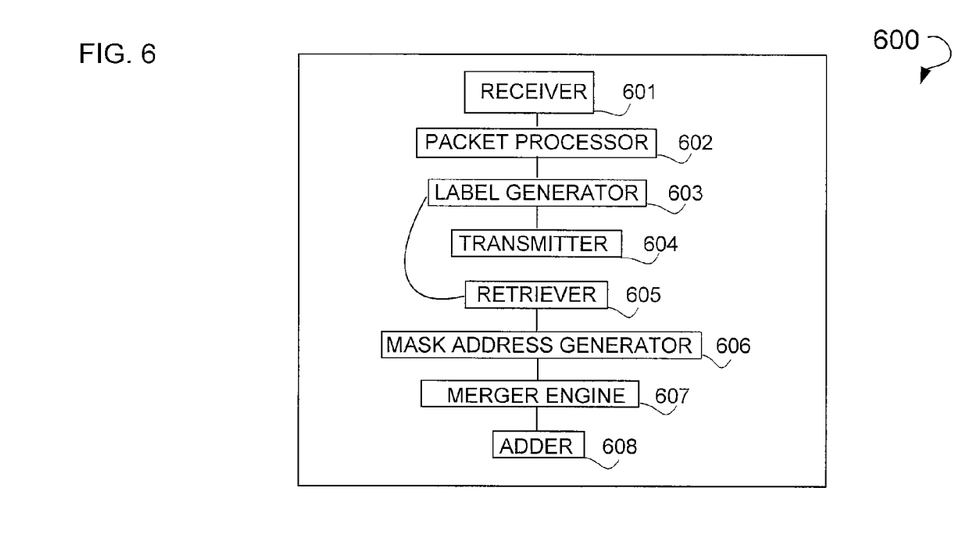
FIG. 6 is a block diagram of a computer system, according to an example embodiment, used to select and advertise an aggregate label and FEC.

FIG. 6 is a block diagram of an example computer system 600 used to select and advertise an aggregate label (e.g., the Agg.-IPv4 Label) and FEC. The blocks illustrated herein may be implemented in hardware, firmware, or software. These blocks 601 through 608 may be implemented by the PE 110 or some other suitable computer system. A receiver 601, a packet processor 602, label generator 603, transmitter 604, retriever 605, mask address generator 606, a merger engine 607, and an adder 608 are shown. Further, these blocks are communicatively coupled via a logical or physical connection. Illustrated is a computer system 600 that includes a receiver 601 to receive a packet to be routed to a destination address. Communicatively coupled to the receiver 601 is a packet processor 602 to process the packet to identify an aggregate label covering the destination address. Communicatively coupled to the packet processor 602 is a label generator 603 to generate a De-Agg. Label based upon the destination address. Communicatively coupled to the label generator 603 is a transmitter 604 to transmit the defined class label and the De-Agg. Label as part of a label stack. In some example embodiments, the label generator generates 603 the De-Agg. Label algorithmically. Communicatively coupled to the label generator 603 is a retriever 605 to retrieve a routing summary including a range of addresses that includes the destination address. Further, communicatively coupled to the retriever 605 is a mask address generator 606 to create a mask address where high order bits for a length of the routing summary are set to binary "0" and lower order bits of the routing summary are set to binary "1. " Additionally, communicatively coupled to the mask address generator 606 is a merger engine 607 to combine the mask address and the destination address based upon finding a logical "AND" of the mask address and the destination address. An adder 608 is communicatively coupled to the merger engine 607 to add binary 16 to the combination to generate the De-Agg. Label. In some example embodiment, the label stack includes an aggregate label received from a next hop.

Figure 7:
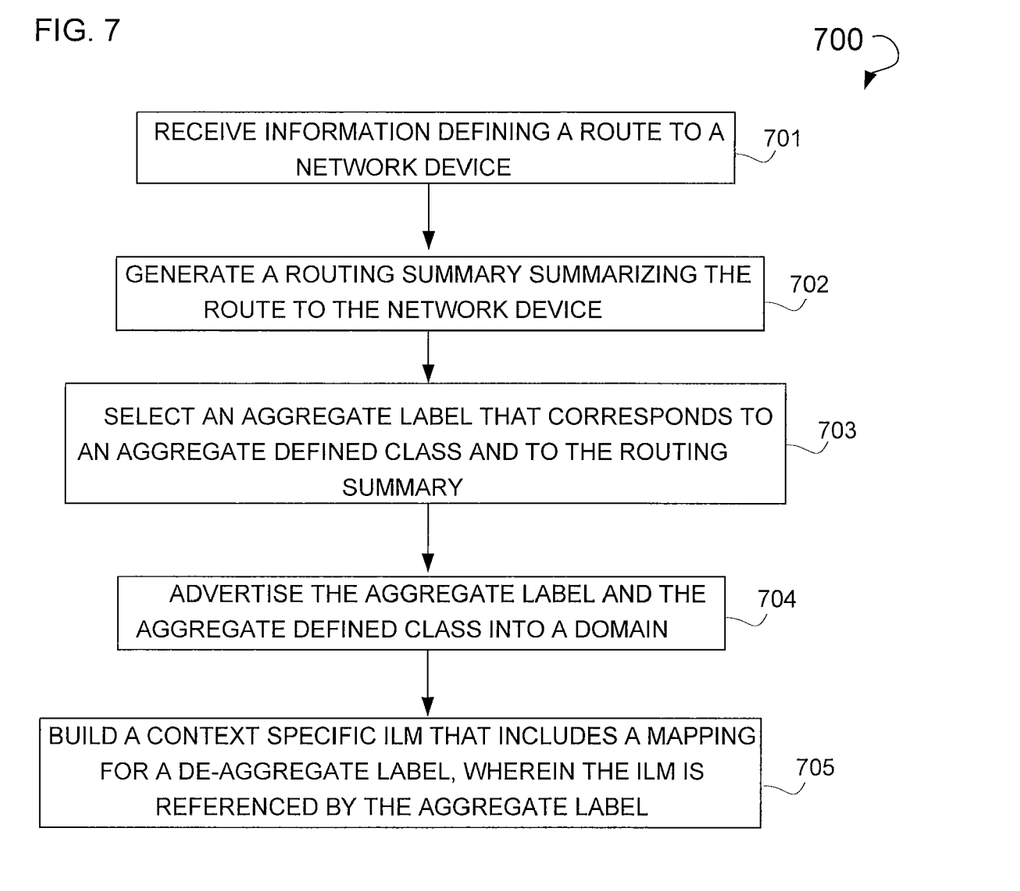
FIG. 7 is a flow chart illustrating a method, according to an example embodiment, used to advertise an aggregate label and an aggregate FEC.

FIG. 7 is a flow chart illustrating an example method 700 used to advertise an aggregate label (e.g., the Agg.-IPv4 Label) and an aggregate FEC. Shown are various operations 701 through 705 that may be executed by the ABR 130 or some other suitable network device. Illustrated is an operation 701 that, when executed, receives information defining a route to a network device. Operation 702 is executed to generate a routing summary summarizing the route to the network device. Operation 703 is executed to select an aggregate label that corresponds to a defined class and to the routing summary. Operation 704 is executed to advertise the aggregate label and the defined class into a domain. In some example embodiments, the defined class has semantics that include an algorithm for generating a De-Agg. Label for a destination address covered by the routing summary. The algorithm may include the destination address and a length of the routing summary. An operation 705 is executed to build a context specific ILM that includes a mapping for a De-Agg. Label, wherein the ILM is referenced by the aggregate label. In some example embodiments, the mapping for the De-Agg. Label maps to a label for the route. Additionally, the aggregate label for the route is received via a protocol including at least one of a LDP or BGP.

Figure 8:
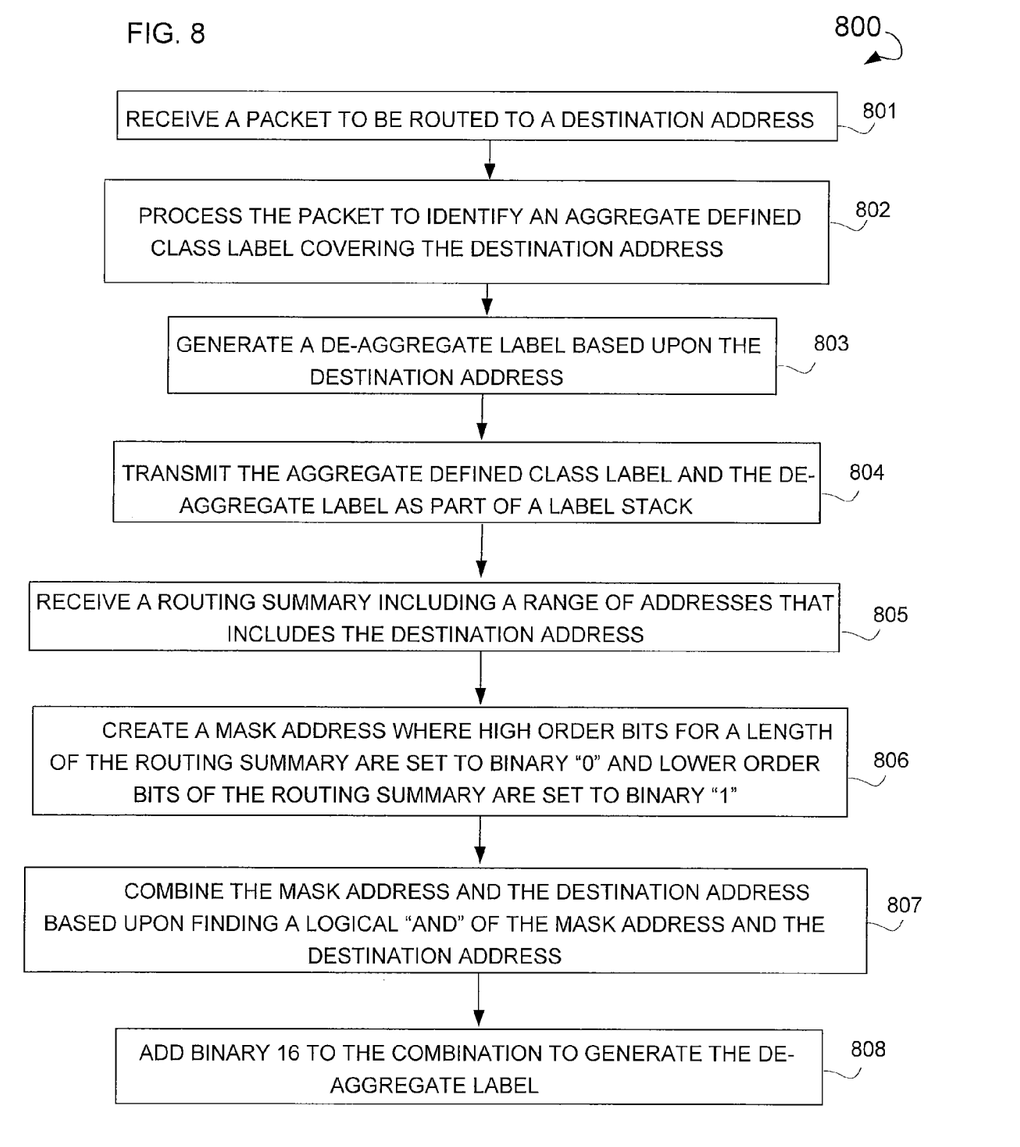
FIG. 8 is a flow chart illustrating a method, according to an example embodiment, used to transmit a packet using an Aggregate Label and a De-Agg. Label.

FIG. 8 is a flow chart illustrating an example method 800 used to transmit a packet using an Aggregate label and a De-Agg. Label. Shown are various operations 801 through 807 that may be executed by the PE 110 or some other suitable network device. Illustrated is an operation 801 that, when executed, receives a packet to be routed to a destination address. Operation 802 is executed to process the packet to identify a defined class label covering the destination address. Operation 803 is executed to generate a De-Agg. Label based upon the destination address. Operation 804 is executed to transmit the aggregate label and the De-Agg. Label as part of a label stack. In some example embodiments, the generating of the De-Agg. Label is generated algorithmically. An operation 805 is executed to retrieve a routing summary including a range of addresses that includes the destination address. Operation 806 is executed to create a mask address where high order bits for a length of the routing summary are set to binary "0" and lower order bits of the routing summary are set to binary "1." Operation 807 is executed to combine the mask address and the destination address based upon finding a logical "AND" of the mask address and the destination address. Operation 808 is executed to add binary 16 to the combination to generate the De-Agg. Label. In some example embodiments, the label stack includes an aggregate label (e.g., an Agg.-IPv4 Label) received from a next hop.

Figure 9:
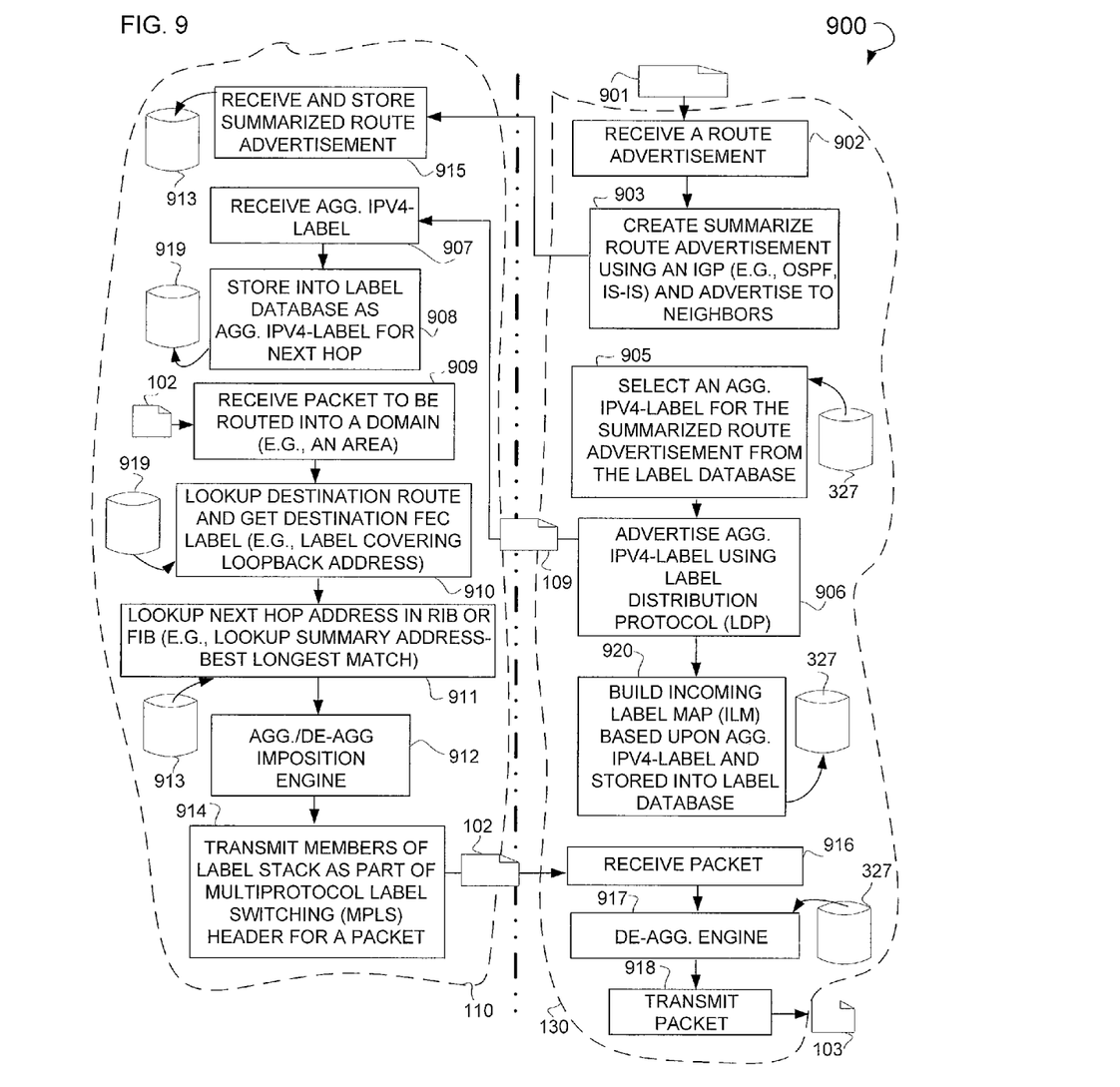
FIG. 9 is a dual-stream flow chart illustrating the execution of a method, according to an example embodiment, used to generate an Agg.-IPv4 Label and a De-Agg. Label.

FIG. 9 is a dual-stream flow chart, illustrating example method 900 used to generate an Agg.-IPv4 Label and a De-Agg. Label. Shown are various operations 902, 903, 905, 906, and 915 through 918 that may reside as a part of an ABR 120. Also shown are a number of operations 907 through 914 that may reside as a part of the PE 110. Residing as a part of the PE 110 is the Label Imposition Engine 313. Further, a label database 327 is associated with the ABR 130, and a label database 919 is associated with the PE 110.

In some example embodiments, a Routing Advertisement 901 is received through the execution of operation 902. An operation 903 is executed that may create a summarized route advertisement using an IGP such as OSPF or IS-IS. This summarized route is advertised to neighbours of the ABR 130. An operation 915 is executed that may receive and store the summarized route into a Forwarding Information Base (FIB)/Routing Information Base (RIB) 913.

In some example embodiments, an operation 905 is executed that may select an Agg.-IPv4 Label for the summarized route generated through the execution of operation 903. This Agg.-IPv4 Label is selected from the previously referenced label database 327. An operation 906 is executed that may advertise the Agg.-IPv4 Label using LDP.

This Agg.-IPv4 Label, such as Agg.-IPv4 Label 109, is transmitted through the execution of operation 906 to be received through the execution of operation 907. Further, an operation 920 is executed that may build a context-specific ILM of De-Agg. Labels based upon the aggregate IPv4-FEC and referenced by the Agg.-IPv4 Label. This De-Agg.-IPv4 Label may then be stored into the context-specific ILM included in the previously referenced label database 327. In examples where operation 907 is executed, and an Agg.-IPv4 Label is received, an operation 908 is executed. This operation 908 may store into a label database 919 the received Agg.-IPv4 Label 109. As illustrated elsewhere, this Agg.-IPv4 Label 109 together with the algorithmically generated De-Agg. Label may represent the LSP for a particular path from the PE 110 to a particular device such as PE 140.

An operation 909 is executed that may receive packet 102. This packet 102 is routed into an area such as Area-2 135 where a PE 140 may exist. An operation 910 is executed that may look up a destination route and get a label for the destination FEC associated with the destination device. The destination FEC may indicate a BGP next-hop address that may be a loop back address (see e.g., loop back addresses 343, 353, or 363). An operation 911 is executed that may lookup the BGP next-hop address in the FIB/RIB 913. An operation 912 is executed that may execute an Agg./De-Agg. imposition engine 912 to build a label stack.

An operation 914 is executed that builds a label stack as part of an MPLS header. This MPLS header may be associated with the packet 102, and through using this MPLS header, this packet 102 may be routed to a destination device such as PE 140. Packet 102 may be transmitted through the execution of operation 909 to be received through an execution of operation 916 at ABR 130.

An operation 917 is executed that may look up the Agg.-IPv4 Label and De-Agg. Label in the label database 327. An operation 918 is executed that may transmit a packet including a new IPv4 Label that corresponds to an IGP next-hop as packet 103. The IGP next-hop for packet 104 may be the ABR 130.

Figure 10:
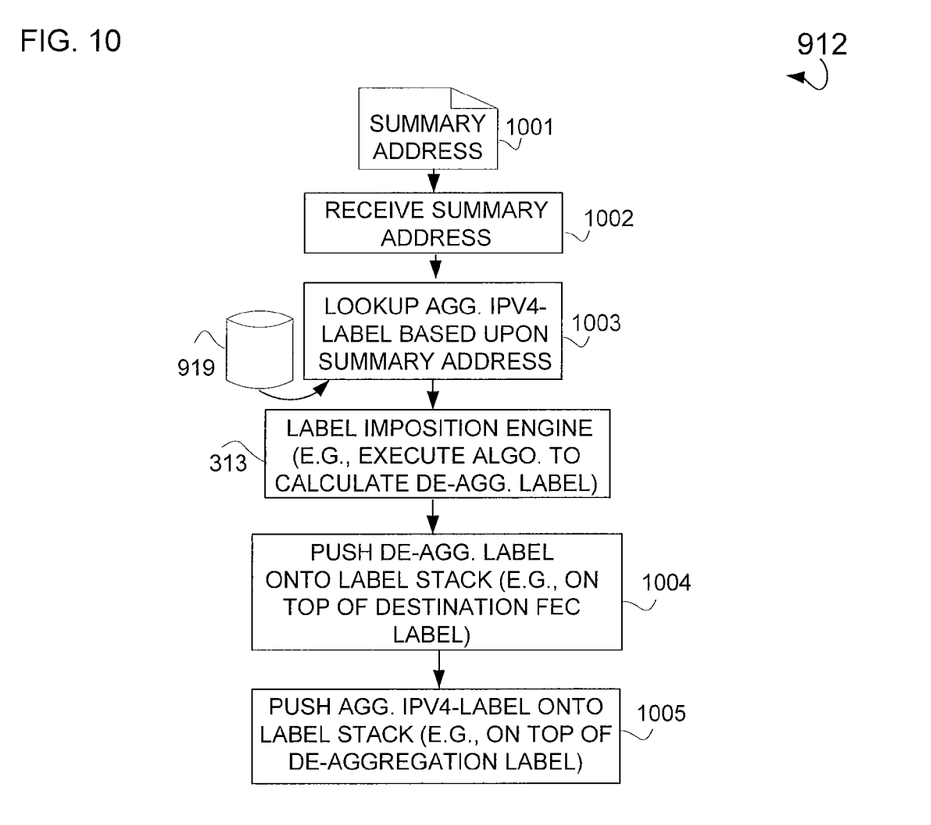
FIG. 10 is a flow chart illustrating the execution of an operation, according to an example embodiment, used to build a label stack.

FIG. 10 is a flow chart illustrating an operation 912 used to build a label stack. Shown are various operations 1002 through 1003, and 1004 through 1005. Also shown is the Label Imposition Engine 313. Operation 1002 when executed may receive a summary address 1001. An operation 1003 is executed that may look up the Agg.-IPv4 Label for the routing summary address covering the BGP next-hop along the path to a destination device having a loop back address to which the packet 102 is to be routed. This look up may occur using the label database 919. At operation 313, a Label Imposition Engine is executed to generate a De-Agg. Label to represent the specific BGP next-hop address. An operation 1004 is executed to push this De-Agg. Label onto a label stack. An operation 1005 is executed that may push an Agg.-IPv4 Label onto the label stack. Specifically, the Agg.-IPv4 Label is pushed on top of the De-Agg. Label in the label stack.

Figure 11:
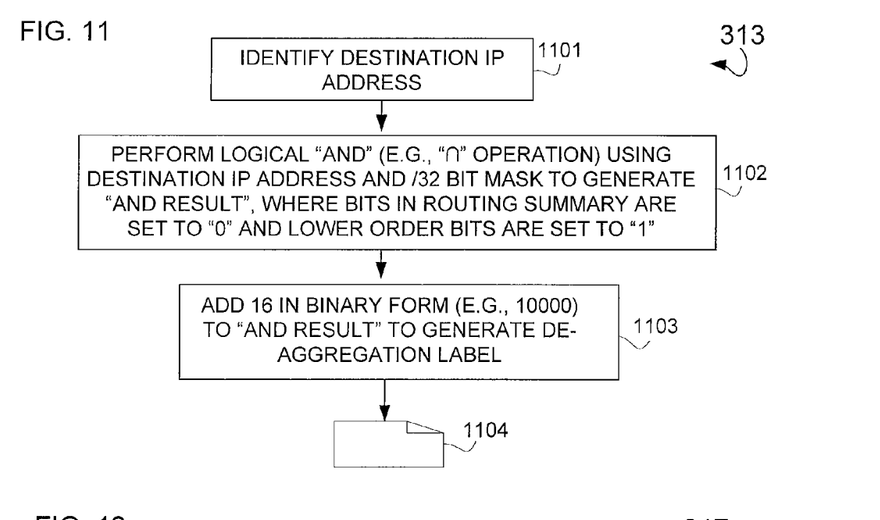
FIG. 11 is a flow chart, illustrating the execution of operation, according to an example embodiment, to algorithmically calculate a De-Agg. Label.

FIG. 11 is a flow chart, illustrating the execution of the Label Imposition Engine 313. Shown is an operation 1101 that may identify a destination IP address that may be a loopback address. This destination IP address may be the destination IP address associated with PE 140. An operation 1102 is executed that may perform a logical "AND" operation (e.g., an intersection operation "∩") using the destination IP address, where the bits in the routing summary for this destination IP address are set to 0, and the lower order bits are set to 1. An operation 1103 is executed that may add decimal 16 in binary form to the result of the "AND" operation to generate a De-Agg. Label such as De-Agg. Label 1104.

In some example embodiments, various other suitable mathematical functions may be utilized to generate a De-Agg. Label. These other suitable mathematical functions may include the use of various set operations such as a set difference (e.g., a set difference operation "−") function, a bit shifting function, or other suitable mathematical functions.

Figure 12:
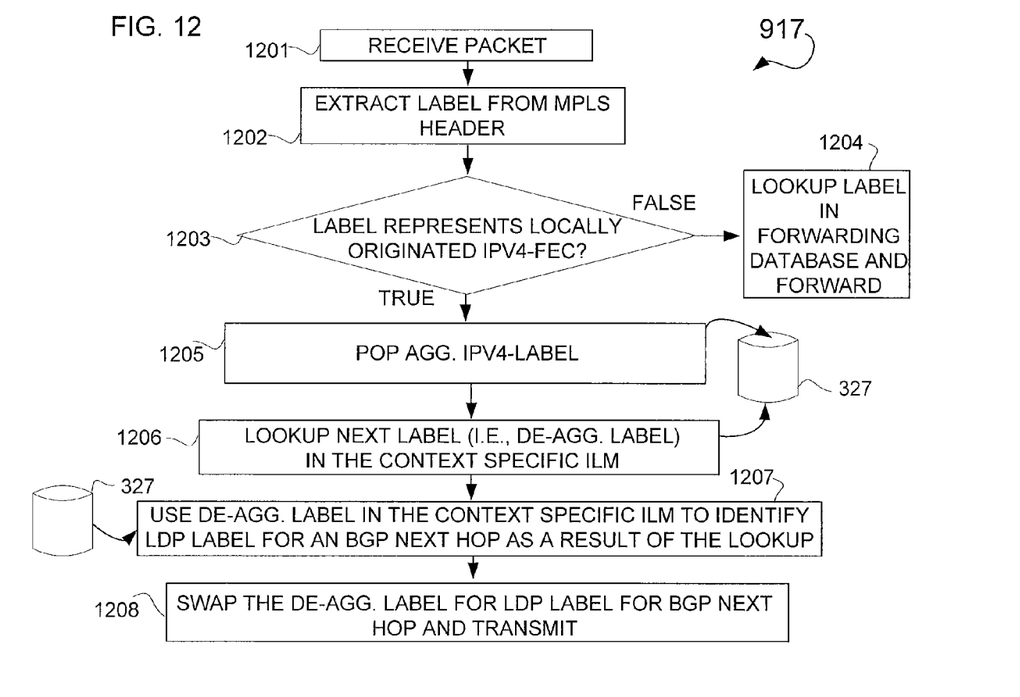
FIG. 12 is a flow chart, illustrating the execution of an operation, according to an example embodiment, to look up the Agg.-IPv4 Label in the label database.

FIG. 12 is a flow chart, illustrating the execution of operation 917. Shown is an operation 1201 that may receive a packet. An operation 1202 is executed that may extract a label from an MPLS header associated with packet. A decisional operation 1203 is executed that may determine whether the extracted label represents a locally originated Agg.-IPv4-FEC. In examples where decisional operation 1203 evaluates to "false," an operation 1204 is executed that may retrieve the label from the forwarding database, and then forward this packet based upon the retrieved FEC value or IP value associated with the label. In cases where decisional operation 1203 evaluates to "true," an operation 1205 is executed that may pop the Agg.-IPv4 Label from the label stack and locate the associated context-specific ILM.

An operation 1206 is executed that may lookup the De-Agg. Label in the context-specific ILM. The ILM may reside as a part of the label database 327. An operation 1207 is executed that may use the De-Agg. Label in the context-specific ILM to identify a label (e.g., an LDP label for the BGP next-hop) as a result of the lookup. An operation 1208 is executed that may swap the De-Agg. Label for the LDP label for the BGP next-hop, and transmit the packet or otherwise utilize the previously referenced operation 918. In some example embodiments, the functionality illustrated by operations 1206 and 1207 may be combined into one single operation.

Figure 13:
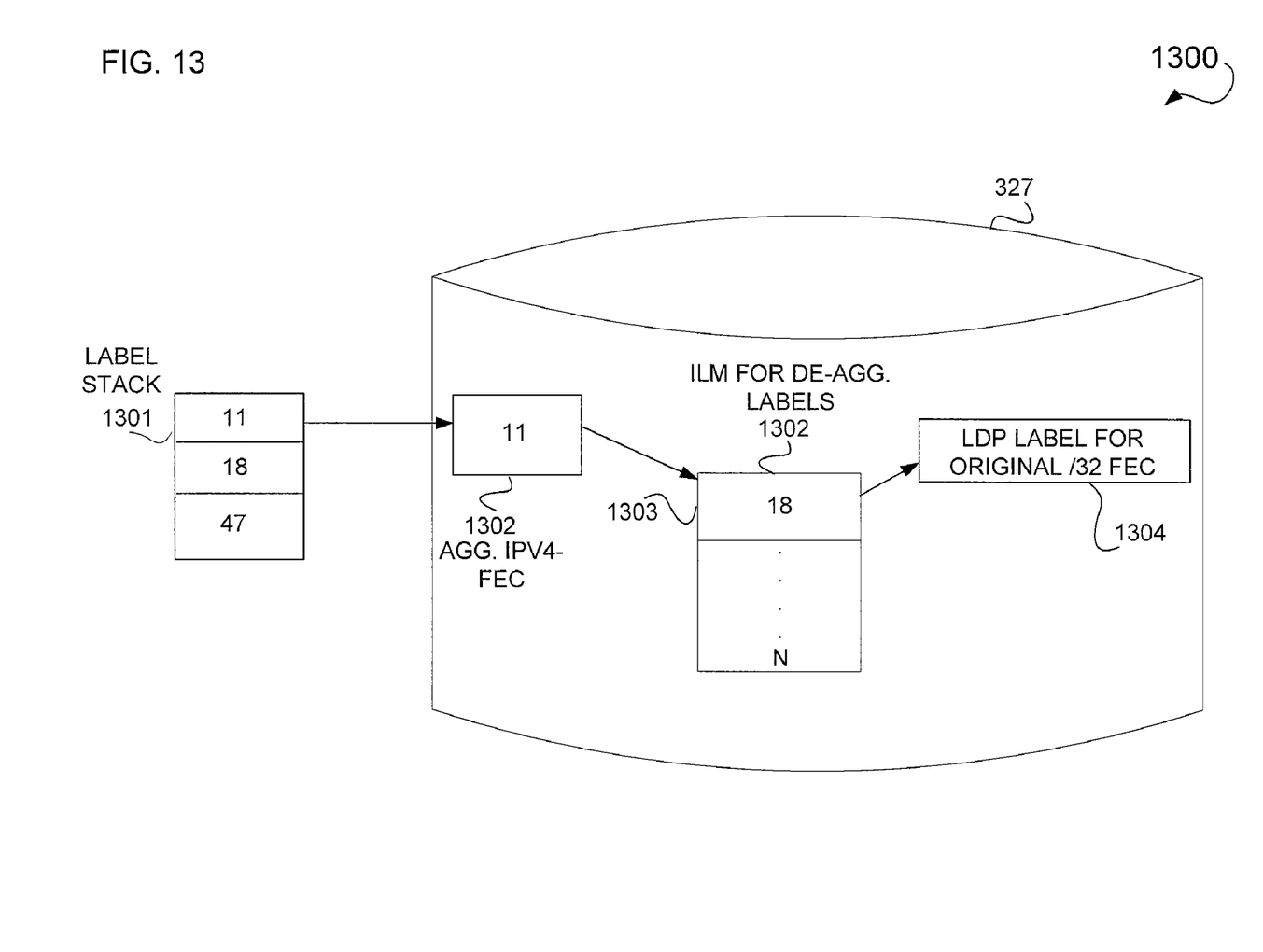
FIG. 13 is a diagram illustrating the label swapping process, according to an example embodiment, in which the label database is utilized.

FIG. 13 is a diagram, illustrating the label swapping process in which the label database 327 is utilized. Shown is a label stack 1301 including an Agg.-IPv4 label referenced as {11}, a De-Agg. Label referenced as {18} and a destination VPN label referenced as {47}. This Agg.-IPv4 label {11}, referenced herein as 1302, may be used to look up in a context-specific ILM a De-Agg. Label (e.g., here referenced here as 1303). Through using this De-Agg. Label, an LDP label for an originating /32 bit address value may be retrieved (e.g., referenced herein as 1304). This look up process may occur using as previously referenced the label database 327.

Figure 14:
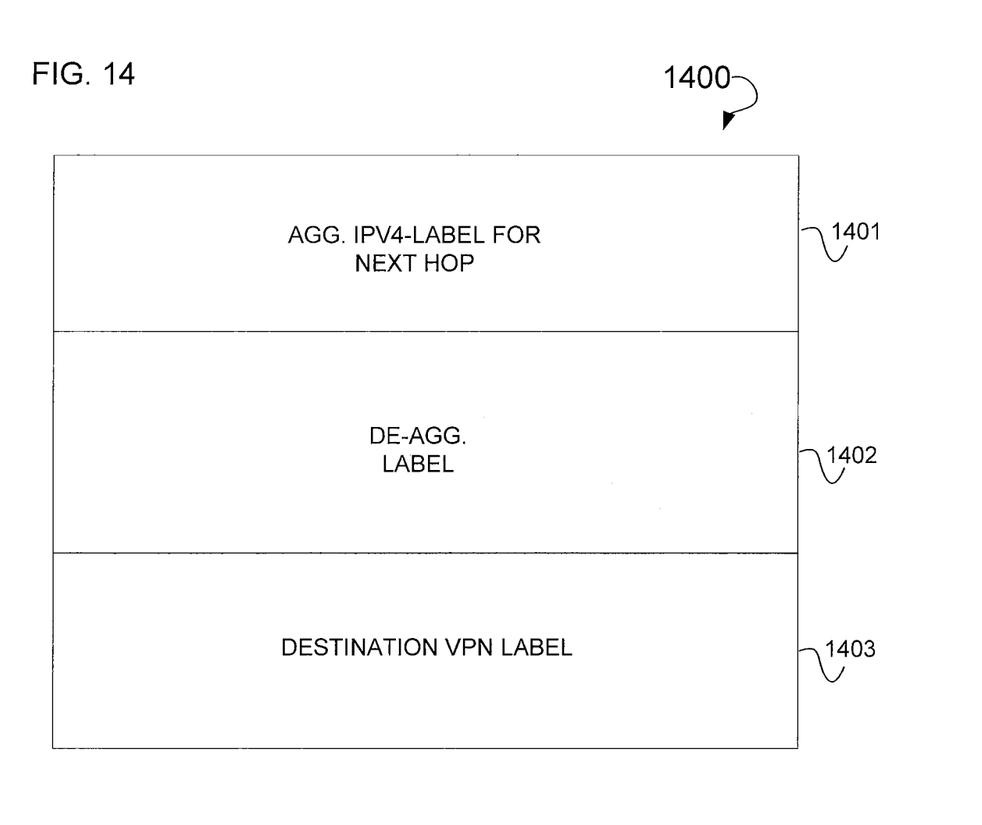
FIG. 14 is a diagram, illustrating a label stack, according to an example embodiment, and the structure associated therewith.

FIG. 14 is a diagram, illustrating a label stack 1400, and the structure associated therewith. Shown is a first position 1401 in the stack including an Agg.-IPv4 label. Also shown is a second position 1402 in the stack illustrating a De-Agg. Label. Finally, a third position 1403 is shown showing a destination VPN label. This stack structure 1400 outlines a high level structure for the previously referenced label stacks 402 and 403.

Figure 15:
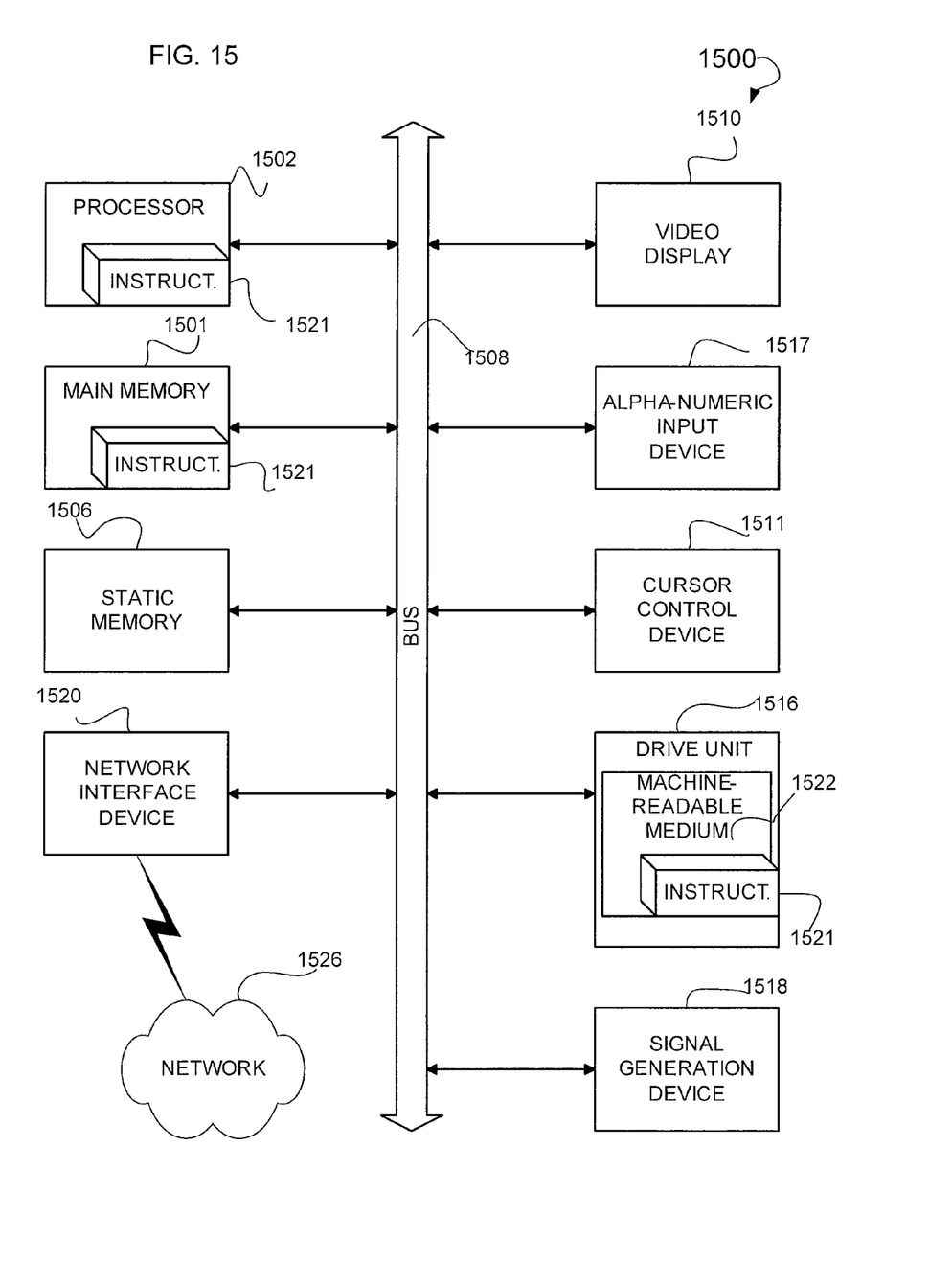
FIG. 15 shows a diagrammatic representation of machine, according to an example embodiment, in the form of a computer system.

FIG. 15 shows a diagrammatic representation of machine in the example form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a Central Processing Unit (CPU), a Graphics Processing Unit (GPU) or both), a main memory 1501 and a static memory 1506, which communicate with each other via a bus 1508. The computer system 1500 may further include a video display unit 1510 (e.g., a Liquid Crystal Display (LCD), plasma display, or a Cathode Ray Tube (CRT)). The computer system 1500 also includes an alphanumeric input device 1517 (e.g., a keyboard), a User Interface (UI) navigation device 1511 (e.g., a mouse), a disk drive unit 1516, a signal generation device 1518, and a network interface device 1520.

The disk drive unit 1516 includes a machine-readable medium 1522 on which is stored one or more sets of instructions and data structures (e.g., software 1521) embodying or used by any one or more of the methodologies or functions described herein. The software 1521 may also reside, completely or at least partially, within the main memory 1504 and/or within the processor 1502 during execution thereof by the computer system 1500, the main memory 1504 and the processor 1502 also constituting machine-readable media.

The software 1521 may further be transmitted or received over a network 1526 via the network interface device 1520 using any one of a number of well-known transfer protocols (e.g., LDP, OSPF, or IS-IS).

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the example embodiments, or that is capable of storing, encoding, or carrying data structures used by or associated with such a set of instructions. The term "machine-readable medium" shall accordingly be taken to include, but not be limited to, solid-state memories, optical and magnetic media, and carrier wave signals. The computer 1500 may be programmed to perform the functionality of the PEs 110, 140, 150, and 160, and/or ABRs 120 and 130.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving information defining a route to a network device;
    using one or more processors, generating a routing summary that includes the route to the network device;
    using a label selector, selecting an aggregate label that corresponds to a defined class and to the routing summary; and
    advertising the aggregate label and the defined class into a domain, the defined class having semantics that include an algorithm for generating a de-aggregate label for a destination address covered by the routing summary, the algorithm comprising information with respect to operations to:
        create a mask address where high order bits for a length of the routing summary are set to binary "0" and lower order bits of the routing summary are set to binary "1",
        combine the mask address and the destination address based upon finding a logical "AND" of the mask address and the destination address, and
        add binary 16 to the combination to generate the de-aggregate label.

2. The method of claim 1, further comprising building a context specific Incoming Label Map (ILM) that includes a mapping for the de-aggregate label, wherein the ILM is referenced by the aggregate label.

3. The method of claim 2, wherein the mapping for the de-aggregate label maps to a label for the route.

4. The method of claim 2, wherein the aggregate label corresponding to the routing summary is advertised via a protocol including at least one of a Label Distribution Protocol (LDP) or a Border Gateway Protocol (BGP).

5. A method comprising:
    receiving a packet to be routed to a destination address;
    using one or more processors, processing the packet to identify an aggregate label covering the destination address;
    using a label generator, generating a de-aggregate label based upon the destination address, generating of the de-aggregate label comprising:
        retrieving a routing summary including a range of addresses that includes the destination address, creating a mask address where high order bits for a length of the routing summary are set to binary "0" and lower order bits of the routing summary are set to binary "1", combining the mask address and the destination address based upon finding a logical "AND" of the mask address and the destination address, and adding binary 16 to the combination; and transmitting the aggregate label and the de-aggregate label as part of a label stack.

6. The method of claim 5, wherein the label stack includes an aggregate label received from a next hop.

7. A network device comprising:

a receiver to receive information that defines a route to a network device;

a route summary generator that generates a routing summary that includes the route to another network device;

a label selector that selects an aggregate label that corresponds to a defined class and to the routing summary; and a transmitter to advertise the aggregate label and the defined class into a domain, the defined class having semantics that include an algorithm for generating a de-aggregate label for a destination address covered by the routing summary, the algorithm comprising information with respect to operations to:

create a mask address where high order bits for a length of the routing summary are set to binary "0" and lower order bits of the routing summary are set to binary "1", combine the mask address and the destination address based upon finding a logical "AND" of the mask address and the destination address, and add binary 16 to the combination to generate the de-aggregate label.

8. The network device of claim 7, further comprising a map builder to build a context specific Incoming Label Map (ILM) that includes a mapping for the de-aggregate label, wherein the ILM is referenced by the aggregate label.

9. The network device of claim 8, wherein the de-aggregate label maps to a label for the route.

10. The network device of claim 8, wherein the aggregate label corresponding to the routing summary is advertised via a protocol including at least one of a Label Distribution Protocol (LDP) or a Border Gateway Protocol (BGP).

11. A network device comprising:

a receiver to receive a packet to be routed to a destination address;

a packet processor to process the packet to identify an aggregate label covering the destination address;

a label generator to generate a de-aggregate label based upon the destination address, generating of the de-aggregate label comprising:

retrieving a routing summary including a range of addresses that includes the destination address, creating a mask address where high order bits for a length of the routing summary are set to binary "0" and lower order bits of the routing summary are set to binary "1", combining the mask address and the destination address based upon finding a logical "AND" of the mask address and the destination address, and adding binary 16 to the combination; and a transmitter to transmit the aggregate label and the de-aggregate label as part of a label stack.

12. The network device of claim 11, wherein the label stack includes an aggregate label received from a next hop.

* * * * *